US009721088B2

(12) United States Patent
Miura et al.

(10) Patent No.: US 9,721,088 B2
(45) Date of Patent: Aug. 1, 2017

(54) EVALUATION OF A PASSWORD

(71) Applicant: International Business Machines Corporation, Armonk, NY (US)

(72) Inventors: Takeshi Miura, Tokyo (JP); Hiroyuki Takenoshita, Kanagawa (JP); Yuji Yanagihara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 14/864,986

(22) Filed: Sep. 25, 2015

(65) Prior Publication Data
US 2016/0125182 A1 May 5, 2016

(30) Foreign Application Priority Data
Nov. 5, 2014 (JP) .................. 2014-225627

(51) Int. Cl.
G06F 7/04 (2006.01)
G06F 21/46 (2013.01)

(52) U.S. Cl.
CPC .................. G06F 21/46 (2013.01)

(58) Field of Classification Search
CPC ..................................... G06F 21/46
See application file for complete search history.

(56) References Cited

U.S. PATENT DOCUMENTS

| 7,788,498 | B2 * | 8/2010 | Yang | G06F 21/83 713/183 |
| 8,196,197 | B2 | 6/2012 | Cannizzaro et al. | |
| 8,539,247 | B2 | 9/2013 | McGrew et al. | |
| 8,579,190 | B2 * | 11/2013 | Golueke | G06F 3/04886 235/379 |

(Continued)

FOREIGN PATENT DOCUMENTS

| JP | 2004199320 | 7/2004 |
| JP | 2007148703 | 6/2007 |

(Continued)

OTHER PUBLICATIONS

U.S. Appl. No. 15/095,547, filed Apr. 11, 2016.

(Continued)

*Primary Examiner* — Techane Gergiso
(74) *Attorney, Agent, or Firm* — Jared L. Montanaro

(57) ABSTRACT

A method and computer for assessing whether a password can be generated by using characteristics of a physical arrangement of keys of an input device. A received password includes characters corresponding to respective select keys in a sequence of select keys of the input device. For each select key, a final detection frequency is calculated as a sum of an initial detection frequency and an additive correction. A password determination value is calculated as a ratio of a total number of select keys having a final detection frequency equal to a minimum detection frequency and the total number of select keys in the sequence of select keys. A determination of whether the calculated password determi- (Continued)

nation value is, or is not, less than a predetermined threshold value indicates that the password cannot, or can, respectively, be generated by using the characteristics of the physical arrangement of keys of the input device.

7 Claims, 16 Drawing Sheets

(56) References Cited

U.S. PATENT DOCUMENTS

| | | | |
|---|---|---|---|
| 2002/0054120 A1* | 5/2002 | Kawano | G06F 3/023 715/773 |
| 2003/0140258 A1 | 7/2003 | Nelson et al. | |
| 2005/0057512 A1* | 3/2005 | Du | G06F 3/018 345/168 |
| 2005/0071637 A1* | 3/2005 | Shirakawa | G06F 21/36 713/170 |
| 2006/0053301 A1* | 3/2006 | Shin | G06F 21/36 713/183 |
| 2009/0133120 A1* | 5/2009 | Cannizzaro | G06F 21/46 726/18 |
| 2009/0313696 A1 | 12/2009 | Himberger et al. | |
| 2011/0317194 A1* | 12/2011 | Nakanishi | G06F 3/0237 358/1.13 |
| 2012/0124654 A1* | 5/2012 | Senac | G06F 21/36 726/7 |
| 2012/0235912 A1* | 9/2012 | Laubach | G06F 3/04895 345/163 |
| 2012/0235921 A1* | 9/2012 | Laubach | G06F 3/0238 345/172 |
| 2012/0319958 A1* | 12/2012 | Hiramoto | G06F 3/0236 345/169 |
| 2012/0323788 A1* | 12/2012 | Keresman, III | G06Q 30/0641 705/44 |
| 2012/0326984 A1* | 12/2012 | Ghassabian | G06F 3/0236 345/168 |
| 2013/0046544 A1* | 2/2013 | Kay | G06F 3/04883 704/275 |
| 2013/0269010 A1 | 10/2013 | Wheeler | |
| 2014/0009417 A1* | 1/2014 | Sugimoto | G06F 3/0488 345/173 |
| 2014/0009418 A1* | 1/2014 | Sugimoto | G06F 3/0412 345/173 |
| 2014/0098141 A1* | 4/2014 | Sen | G06F 3/04886 345/660 |
| 2014/0123274 A1* | 5/2014 | Chen | G06F 21/46 726/18 |
| 2014/0181957 A1* | 6/2014 | Nguyen | G06F 21/36 726/19 |

FOREIGN PATENT DOCUMENTS

| | | |
|---|---|---|
| JP | 2008181440 | 8/2008 |
| JP | 2009089279 | 4/2009 |
| JP | 2010079562 | 4/2010 |
| JP | 2011154445 | 8/2011 |

OTHER PUBLICATIONS

Spafford, Eugene H., Preventing Weak Password Choices, Purdue University, spaf©cs.purdue.edu Report No. 91-028, 1991, 12 pages.
Harpreet Singh Dhillon, Second Order Markov Model Based Proactive Password Checker, Department of Electronics and Communication Engineering, IIT Guwahati, India., Roll No. 04010214; email: harpreet@iitg.ernet.in, 2 pages.
Notification of Reasons for Refusal, Japan Application No. 2014-225627, Mar. 7, 2016, 3 pgs.
Written Argument, Japan Application No. 2014-225627, Apr. 4, 2016, 2 pgs.
Written Amendment, Japan Application No. 2014-225627, Apr. 4, 2016, 3 pgs.
Decision to Grant Patent, Japan Application No. 2014-225627, Apr. 15, 2016, 6 pgs.
List of IBM Patents or Patent Applications Treated as Related, Oct. 11, 2016, 2 pgs.

\* cited by examiner

| SELECT KEY | w | d | r | c | z | u | k | p |
|---|---|---|---|---|---|---|---|---|
| OTHER SELECT KEYS IN POSITIONAL RELATIONSHIP OF BEING ADJACENT | NONE | r, c | d | d | u | z | NONE | NONE |
| DETECTION FREQUENCY | 0 | 2 | 1 | 1 | 1 | 1 | 0 | 0 |
| | 0 – 2 + 1 + 1 – 1 – 1 + 1 – 0 – 0 |

FIG. 4

| SELECT KEY | w | d | r | c | 7 | u | k | p |
|---|---|---|---|---|---|---|---|---|
| OTHER SELECT KEYS IN POSITIONAL RELATIONSHIP OF BEING ADJACENT | NONE | r,c | d | d | u | 7 | NONE | NONE |
| DETECTION FREQUENCY BEFORE CORRECTION | 0 | 2 | 1 | 1 | 1 | 1 | 0 | 0 |
| DETECTION FREQUENCY BEFORE CORRECTION | 0 | −2 | +1 | +1 | −1 | +1 | −0 | −0 |
| DETECTION FREQUENCY AFTER CORRECTION | 0 | 2 | 2 | 2 | 1 | 1 | 0 | 0 |
| DETECTION FREQUENCY AFTER CORRECTION | 0 | −2 | +2 | +2 | −1 | +1 | −0 | −0 |

FIG. 5

| KEY ARRANGE-MENT PATTERN | DETECTION FREQUENCY BEFORE CORRECTION | DETECTION FREQUENCY AFTER CORRECTION |
|---|---|---|
| (1) | 1 + 2 + 1 | 2 + 2 + 2 |
| (2) | 1 + 2 + 1 | 2 + 2 + 2 |
| (3) | 1 + 2 + 1 | 2 + 2 + 2 |
| (4) | 2 + 1 + 1 | 2 + 2 + 2 |
| (5) | 1 + 1 + 2 | 2 + 2 + 2 |
| (6) | 1 + 2 + 1 | 2 + 2 + 2 |
| (7) | 1 + 2 + 1 | 2 + 2 + 2 |
| (8) | 1 + 2 + 1 | 2 + 2 + 2 |
| (9) | 1 + 2 + 1 | 2 + 2 + 2 |

FIG. 7

| TOTAL NUMBER OF KEY SELECTING ACTIONS | NUMBER OF SELECT KEYS DETECTED TWICE OR MORE | PASSWORD DETERMINATION VALUE |
|---|---|---|
| 8 | 8 | 8 / 8 = 1 |
| 8 | 7 | 7 / 8 = 0.875 |
| 9 | 9 | 9 / 9 = 1 |
| 9 | 8 | 8 / 9 = 0.889 |
| 10 | 10 | 10 / 10 = 1 |
| 10 | 9 | 9 / 10 = 0.9 |
| 11 | 11 | 11 / 11 = 1 |
| 11 | 10 | 10 / 11 = 0.909 |
| 11 | 9 | 9 / 11 = 0.818 |

FIG. 8

| SELECT KEY | 1 | q | a | z | x | d | r | 5 |
|---|---|---|---|---|---|---|---|---|
| OTHER SELECT KEYS IN POSITIONAL RELATIONSHIP OF BEING ADJACENT | q | 1,a | q,z | a,x | z,d | x,r | d,5 | r |
| INITIAL DETECTION FREQUENCY (BEFORE CORRECTION) | 1 | 2 | 2 | 2 | 2 | 2 | 2 | 1 |
| | 1 + 2 | 1 + 2 + 2 | 2 + 2 + 2 | 2 + 2 + 2 | 2 + 2 + 2 | 2 + 2 + 2 | 2 + 2 + 1 | 2 + 1 |
| FINAL DETECTION FREQUENCY (AFTER CORRECTION) | 2 | 2 | 2 | 2 | 2 | 2 | 2 | 2 |
| | 2 + 2 | 2 + 2 + 2 | 2 + 2 + 2 | 2 + 2 + 2 | 2 + 2 + 2 | 2 + 2 + 2 | 2 + 2 + 2 | 2 + 2 |

EVALUATION OF A PASSWORD

TECHNICAL FIELD

The present invention relates to a system, method, and computer program product for verifying a password.

BACKGROUND

With progress of smart devices, social networks, cloud computing, and the like, dependence on information system is more and more increasing in business and everyday life. When users use an information system, each user generally registers a password in advance and inputs a password that matches the registered password, thereby authentication succeeds and a user concerned can use the information system. If the password matches even though the person who input the password is not the person who originally registered the password, authentication still succeeds and the person who input the matched password is allowed to access the information system. For this reason, strict management of the passwords is required, but most of the passwords registered by users are not constituted of completely random character strings but constituted of character strings which are easy for the users to memorize in actuality.

For example, in the case of passwords derived from words written in dictionaries, dictionary-based sequence passwords, or passwords which can be speculated from personal information such as user's date of birth, the passwords themselves mean something, which makes it easy for users to memorize. Users can also easily memorize, for example, passwords constituted of character strings which do not mean anything themselves but short in their length, passwords generated by using characteristics of physical key arrangement of a keyboard selected for inputting passwords, or keyboard-based sequences passwords. FIGS. 16(a) and 16(b) each describe one example of a password generated by using the characteristics of physical key arrangement. FIG. 16(a) illustrates an example of using shaded keys "1", "q", "a", "z", "x", "s", "w", and "2" out of the keys in the keyboard used for inputting a password. For example, a password "zaq12wsx" is generated by unicursal clockwise input of the keys. It can be said that this password is generated by using the characteristics of physical key arrangement. FIG. 16(b) illustrates an example of using shaded keys "1", "2", "3", "4", "a", "s", "d", and "f" out of keys of the keyboard. For example, a password "asdf1234" generated by using these keys is input by typing the keys successively in a cross direction. It can be said that this password is generated by using the characteristics of physical key arrangement. There is known a technique to determine whether or not a password is generated by using such physical key arrangement. In this technique, for example, passwords generated by using the physical key arrangement are registered in advance, and when a password is input, it is determined whether or not the input password matches any one of the registered passwords.

SUMMARY

A method, and associated computer program product and computer, for assessing whether a password can be generated by using characteristics of a physical key arrangement of keys of an input device. A password is received. The password includes characters corresponding to respective select keys in a sequence of select keys of the input device. There is a one-to-one correspondence between each character in each position in the password and a respective select key in the sequence of select keys. For each select key in the sequence of select keys, an initial detection frequency is determined as equal to a total number of other select keys, in the sequence of select keys, adjacent to each select key. An additive correction to the initial detection frequency of each select key in the sequence of select keys is determined. The additive correction is specific to each select key. For each select key, a final detection frequency is calculated as a sum of the initial detection frequency and the additive correction. A password determination value is calculated as a ratio of a total number of select keys having a final detection frequency equal to a specified minimum detection frequency and the total number of select keys in the sequence of select keys. A determination is made of whether the calculated password determination value is, or is not, less than a predetermined threshold value and the determination indicates that the password cannot, or can, respectively, be generated by using the characteristics of the physical arrangement of keys of the input device. The determination is stored in a database.

BRIEF DESCRIPTION OF THE DRAWINGS

FIG. 4 illustrates one example of a detection result of shaded select keys in FIG. 3, in accordance with embodiments of the present invention.

FIG. 5 illustrates one example of correction performed on the detection result illustrated in FIG. 4, in accordance with embodiments of the present invention.

FIG. 7 illustrates one example of the detection frequency before and after correction in each key arrangement patterns illustrated in FIGS. 6(a) and (b), in accordance with embodiments of the present invention.

FIG. 8 illustrates one example of password determination values when the total number of key selecting actions for inputting the password is 8 to 11, in accordance with embodiments of the present invention.

DETAILED DESCRIPTION

Figure 1:
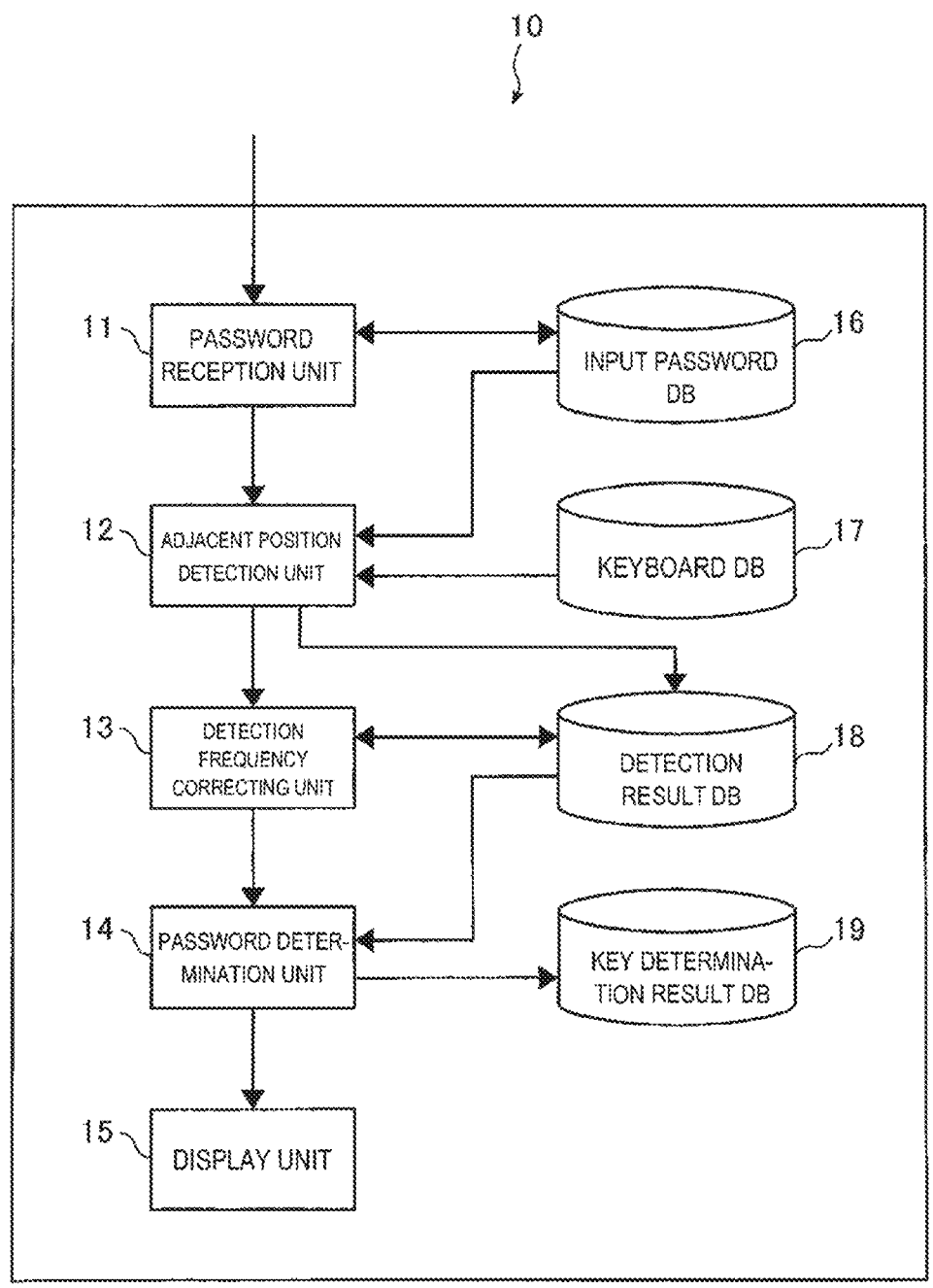
FIG. 1 is a block diagram illustrating a functional configuration example of a password verification system, in accordance with embodiments of the present invention.

In the case of inputting a password generated by using the characteristics of physical key arrangement, users need to remember not all the keys to be selected but start and end positions of the keys to be selected, and regularity of keys to be selected therebetween. Contrary to this, while it is determined that the passwords input by unicursal clockwise input of the keys, like "zaq12wsx", may easily be guessed by other users, passwords generated by simply changing the input order of these characters, such as "1zwqx2as", may be determined to be the passwords which cannot easily be guessed, since these passwords seem to have no regularity at a first glance though they are still generated by using the physical key arrangement. However, when users use such passwords to access the information system, malicious third parties may extract character strings formed by using the characteristics of physical key arrangement and attempt to find out the passwords by switching the characters therein. In this case, the passwords may be cracked in a short period of time. Accordingly, it is demanded to take measures to deter external threats against those passwords generated by using the physical key arrangement.

Embodiments of the present invention suppress use of easily guessable passwords which are generated by using key arrangement.

The present invention may be implemented as a system. The system includes a reception unit configured to receive a password input when keys are selected from a key arrangement unit including a plurality of keys arranged thereon; and a determination unit configured to detect, for each of the selected keys (select keys) included in the password, presence of other select keys (adjacent keys) adjacent thereto, and to determine the password to be an easily guessable password when a predetermined condition concerning the adjacent keys is satisfied.

A password comprises a plurality of characters. Each character in each position in the password corresponds to a respective select key in a sequence of select keys of the input device. Thus, there is a one-to-one correspondence between each character in each position in the password and each select key in the sequence of select keys. The ordering of select keys in the sequence of select keys depends on the physical key arrangement of the select keys in the input device. The ordering of characters in the password does not necessarily correspond to the ordering of select keys in the sequence of select keys.

The determination unit may determine the password to be an easily guessable password when the number of select keys having a plurality of adjacent keys satisfies a predetermined condition.

The determination unit may determine the password to be an easily guessable password when determining that a value, obtained by dividing the number of the select keys having the plurality of adjacent keys by the total number of key selecting actions performed for inputting the password, is equal to or more than a predetermined threshold value is satisfied.

The determination unit may determine the password to be an easily guessable password when the select keys include a select key selected a plurality of times and the select key selected a plurality of times satisfies a predetermined condition.

The system further includes a correcting unit configured to perform correction when at least one of the select keys satisfies a predetermined correction condition, the correction being incrementing the number of the adjacent keys for at least one of the select keys.

When a condition, that the select keys include three or more select keys in a positional relationship of being successively adjacent, is satisfied as the predetermined correction condition, the correcting unit performs correction of incrementing the number of the adjacent keys for these three or more select keys in positional relationship of being successively adjacent.

Furthermore, when a condition that the select keys include a select key selected a plurality of times is satisfied as the predetermined correction condition, the correcting unit performs correction of incrementing the number of the adjacent keys for the select key selected a plurality of times.

The present invention may be implemented as a following system. The system includes a reception unit configured to receive a password input when keys arranged on a keyboard are selected; a storage unit configured to store key arrangement information indicative of key arrangement of the keyboard used for inputting the password; a key detection unit configured to detect, for each of the selected keys (select keys) received in the reception unit, other keys (adjacent keys) adjacent to each of the select keys, with reference to the key arrangement information stored in the storage unit; a calculation unit configured to calculate a specified value based on the number of the select keys which have two or more adjacent keys detected in the key detection unit; a determination unit configured to compare the value calculated by the calculation unit and a predetermined threshold value, and to determine the password to be an easily guessable password when the calculated value is equal to or more than the predetermined threshold value; and a display unit configured to display a result of determination by the determination unit.

Furthermore, the present invention provides a method, including the steps of: receiving a password input when keys are selected from a key arrangement unit including a plurality of keys arranged thereon; and detecting, for each of the selected keys (select keys) included in the password, presence of other select keys (adjacent keys) adjacent thereto, and determining the password to be an easily guessable password when a predetermined condition concerning the adjacent keys is satisfied.

The present invention may also implemented as program code for implementing each function of the aforementioned system by controlling a computer, or as program code causing the computer to execute processing corresponding to each step in the above-described method. This program code can be delivered in the form of being stored in a magnetic disk, an optical disc, a semiconductor memory, and other recording media, or be distributed via a network.

The present invention can suppress use of easily guessable passwords which are generated by using a key arrangement.

Hereinafter, an embodiment of the present invention will be described in detail with reference to the accompanying drawings. A password verification system 10 according to the present embodiment determines whether or not passwords are generated by using characteristics of physical key arrangement and thus easily guessable passwords in such occasions as when users register passwords for authentication to use an information system for the first time and when users change registered passwords to new ones. When determining that the passwords are easily guessable passwords, the password verification system 10 notifies the users of the determination result.

First, the functional configuration of the password verification system 10 according to the embodiment will be described. FIG. 1 is a block diagram illustrating a functional configuration example of the password verification system 10 according to the present embodiment. As illustrated in the drawing, the password verification system 10 includes a password reception unit 11, an adjacent position detection unit 12, a detection frequency correcting unit 13, a password determination unit 14, and a display unit 15. The password verification system 10 also includes an input password database (input password DB) 16, a keyboard database (keyboard DB) 17, a detection result database (detection result DB) 18, and a key determination result database (key determination result DB) 19.

The password reception unit 11 as one example of the reception unit receives a password input by a user. The user inputs the password by manipulating a key arrangement unit (for example, a keyboard) including a plurality of keys arranged thereon to select keys. Here, the input password DB 16 stores a password permission rule based on which the password reception unit 11 receives passwords. That is, the password reception unit 11 refers to the password rule stored in the input password DB 16, and when input passwords are in conformity to the password rule, the password reception unit 11 receives the passwords. The password rule prescribes, for example, the number of characters allowed as a password (for example, five or more characters), and kinds of characters allowed as a password (for example, alphabets, numerical figures, and symbols). The password reception unit 11 stores the received password in the input password DB 16.

The adjacent position detection unit 12 as one example of the key detection unit and the calculation unit detects, for each key selected for inputting a password (hereinafter the keys selected for inputting a password are referred to as select keys), other select keys in positional relationship of being adjacent to each other, in the password stored in the input password DB 16 (that is, the password received by the password reception unit 11).

Here, the adjacent position detection unit 12 first acquires information indicative of key arrangement of a keyboard used by the user for inputting the password, from the keyboard DB 17. The adjacent position detection unit 12 then refers to the acquired key arrangement information and detects, for each select key, other keys which are placed at the periphery of these select keys, such as on upper, lower, left, right, and oblique sides of each select key and which are in positional relationship of being adjacent. Next, the adjacent position detection unit 12 detects other select keys in positional relationship of being adjacent to each other, based on the information on the adjacent other keys detected for each select key. The adjacent position detection unit 12 stores, for each select key, the number of other select keys (hereinafter referred to as detection frequency) detected to be in positional relationship of being adjacent, in the detection result DB 18 as a detection result. In the present embodiment, adjacent other select keys are used as one example of the adjacent keys.

Figure 2:
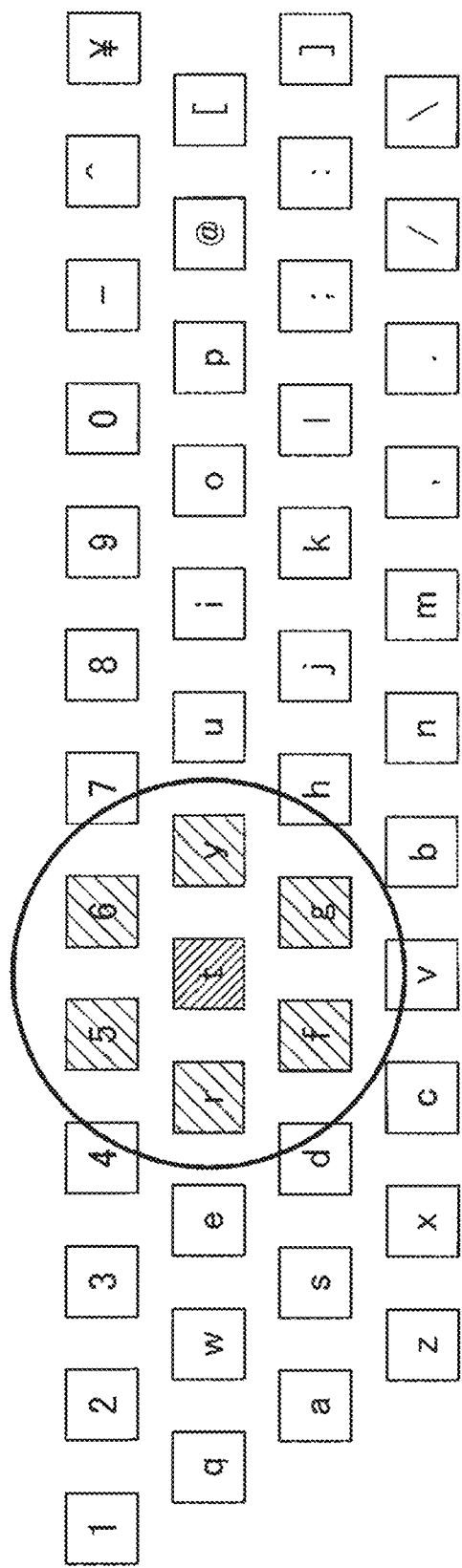
FIG. 2 describes one example of keys which are in positional relationship of being adjacent, in accordance with embodiments of the present invention.

FIG. 2 describes one example of keys which are in a positional relationship of being adjacent. Definitionally, two select keys on an input device (e.g., a keyboard) are adjacent to each other if no other key on the keyboard is disposed between the two keys.

For each select key in the sequence of select keys, an initial detection frequency is equal to a total number of other select keys, in the sequence of select keys, adjacent to each select key. A correction to the initial detection frequency of each select key may be added to the to the initial detection frequency of each select key to form a final detection frequency of each select key.

In the example illustrated in FIG. 2, a shaded key "t" has shaded other keys "5", "6", "y", "g", "f", and "r" which are in positional relationship of being adjacent, such as on upper, lower, left, right, and oblique sides of the key "t." Here, for example, when one of the characters constituting a password is "t", and the password also includes two characters, "f" and "r", the adjacent position detection unit 12 detects "f" and "r" as other select keys which are in positional relationship of being adjacent to the select key "t." Accordingly, the adjacent position detection unit 12 stores "2" (twice) as the detection frequency of the key "t" in the detection result DB 18.

The detection frequency correcting unit 13, as one example of the correcting unit, corrects the detection frequency of each select key detected by the adjacent position detection unit 12 in accordance with a predetermined correction condition. Based on the result of correction, the detection frequency correcting unit 13 updates the detection frequency of each select key stored in the detection result DB 18. The details of the predetermined correction condition will be described later.

The password determination unit 14 as one example of the determination unit determines whether or not the input password can be generated by using the characteristics of physical key arrangement and is an easily guessable password, based on the detection frequency of each select key stored in the detection result DB 18. Here, the password determination unit 14 performs determination based on the total number of characters and/or symbols constituting a password to be determined, that is, the total number of key selecting actions performed for inputting the password, and the number of select keys detected twice or more among all the select keys. The details of the password determination by the password determination unit 14 will be described later. The password determination unit 14 outputs a determination result to the display unit 15 and stores the result in the key determination result DB 19.

The display unit 15 as one example of the display unit is, for example, a display apparatus, such as a liquid crystal display, which displays the determination result by the password determination unit 14 and notifies the result of the user concerned. When the password determination unit 14 determines that the password can be generated by using the characteristics of physical key arrangement, the display unit 15 displays a message communicating, for example, that the password needs to be changed since the password is an easily guessable password. In one embodiment, the message is communicated to a user, wherein the message instructs the user to change the password.

The input password DB 16 stores a password rule predetermined for passwords to be input by users. The input password DB 16 stores the passwords received by the password reception unit 11.

The keyboard DB 17, as one example of the storage unit, stores information on the key arrangement of the keyboards used by users. Examples of the keyboards used by users include keyboards for Windows® by Microsoft Corp., and keyboards for Macintosh® by Apple Inc., depending on an operating system (OS) to be used. The key arrangement of the keyboards may be different depending on manufacturers of the keyboards. The keyboard DB 17 stores information on the key arrangement of various kinds of keyboards which may be used by users. The adjacent position detection unit 12 acquires, from the keyboard DB 17, information on the key arrangement corresponding to the keyboard used by the user for inputting the password.

The detection result DB 18 stores the detection frequency of each select key as the detection result provided by the adjacent position detection unit 12.

The key determination result DB 19 stores the password determination result by the password determination unit 14.

Figure 3:
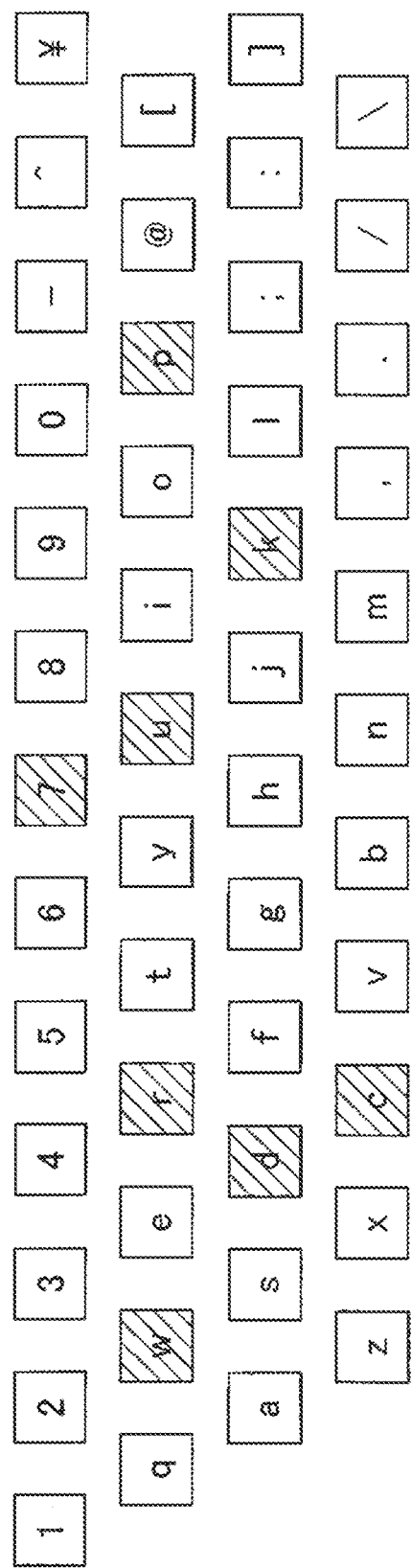
FIG. 3 describes one example of processing to detect the select keys in positional relationship of being adjacent to each other, in accordance with embodiments of the present invention.

The processing of the adjacent position detection unit 12 to detect, for each select key, other select keys in positional relationships of being adjacent to each other is described in detail. FIG. 3 describes one example of the processing to detect the select keys which are in positional relationships of being adjacent to each other. In the example illustrated in FIG. 3, eight shaded keys "w, r, d, c, 7, u, k, p" are illustrated. By selecting these keys in order, a password of eight characters (for example, wrdc7ukp) is input. In this case, the detection frequency of each select key detected by the adjacent position detection unit 12 does not vary even when these keys are selected in different orders to input an eight-character password. That is, in the case of passwords "wrdc7ukp" and "dc7rupkw" for example, the detection frequency of each select key is the same in both the passwords. Even if the order of key selection is changed, the determination results of these passwords are identical.

The adjacent position detection unit 12 first detects, for each select key, other keys which are placed at the periphery of each of the select keys and are in positional relationship of being adjacent. For example, in the case of the key "w", the adjacent position detection unit 12 detects keys "2", "3", "e", "s", "a", and "q" as other keys which are in positional relationship of being adjacent. Next, the adjacent position detection unit 12 detects, for each select key, other select keys in positional relationship of being adjacent to each other, based on information on the other keys detected to be adjacent, and counts the detection frequency thereof.

Here, the adjacent position detection unit 12 counts the detection frequency of each of the select keys from the left side to the right side on the keyboard. As for the select keys in positional relationship of being upper and lower sides, the detection frequency of the select key on the upper side is counted first. More specifically, in the example illustrated in FIG. 3, the adjacent position detection unit 12 counts the detection frequency of eight select keys "w, r, d, c, 7, u, k, p" in order of "w→d→r→c→7→u→k→p."

When two select keys positioned to be counted consecutively are in a positional relationship of being successively adjacent to each other, the adjacent position detection unit 12 attaches a plus (+) symbol to between detection frequencies of these two select keys when the detection frequency of each select key is counted. When two select keys positioned to be counted consecutively are not in positional relationship of being successively adjacent to each other, the adjacent position detection unit 12 attaches a minus (−) symbol to between detection frequencies of these two select keys.

Specifically, for example, the key "w" whose detection frequency is counted first does not have other select keys that are adjacent thereto. Since there is no select key between the key "w" and the key "d" whose detection frequency is counted next, it can be said that these keys "w" and "d" are not in positional relationship of being successively adjacent. Accordingly, the detection frequency of the key "w" is counted as "0" and a minus (−) symbol is attached to between the detection frequency (that is, "0") of the key "w" and the detection frequency of the key "d."

The key "d" whose detection frequency is counted after the key "w" is adjacent to other select keys "r" and "c", and so the detection frequency thereof is counted as "2." Since the key "d" and the key "r" whose detection frequency is counted next are adjacent, they are in positional relationship of being successively adjacent. Accordingly, a plus (+) symbol is attached to between the detection frequency (that is, "2") of the key "d" and the detection frequency of the key "r."

The key "r" whose detection frequency is counted after the key "d" is adjacent to another select key "d", so the detection frequency thereof is counted as "1". Since the key "d" is present between the key "r" and the key "c" whose detection frequency is counted next, the keys "r", "d", and "c" are successively adjacent. That is, it can be said that the keys "r" and "c" are in positional relationship of being successively adjacent. Accordingly, a plus (+) symbol is attached to between the detection frequency (that is, "1") of the key "r" and the detection frequency of the key "c."

The detection frequency of subsequent keys "c", "7", "u", "k", and "p" is similarly counted as "1", "1", "1", "0", and "0", respectively. Since the keys "c" and "7" are not in positional relationship of being successively adjacent, a minus (−) symbol is attached to between the detection frequency (that is, "1") of the key "c" and the detection frequency (that is, "1") of the key "7". Since the keys "7" and "u" are in positional relationship of being successively adjacent, a plus (+) symbol is attached to between the detection frequency (that is, "1") of the key "7" and the detection frequency (that is, "1") of the key "u". Since the keys "u" and "k" are not in positional relationship of being successively adjacent, a minus (−) symbol is attached to between the detection frequency (that is, "1") of the key "u" and the detection frequency (that is, "0") of the key "k". Since the keys "k" and "p" are not in positional relationship of being successively adjacent, a minus (−) symbol is attached to between the detection frequency (that is, "0") of the key "k" and the detection frequency (that is, "0") of the key "p". Since the key "p" is the key whose detection frequency is lastly counted, no symbol is attached after the detection frequency of the key "p."

FIG. 4 illustrates one example of a detection result of shaded select keys in FIG. 3. The detection result of eight select keys "w, d, r, c, 7, u, k, p" is illustrated as a sequence of select keys. For example, it is indicated that the select key "d" has other select keys "r" and "c" which are in positional relationship of being adjacent, and has a detection frequency of "2." It is also indicated that a sequence "0−2+1+1−1+1−0−0" is obtained by arraying the detection frequency of each select key. This detection frequency sequence is used for correction of the detection frequency performed by the detection frequency correcting unit 13. The adjacent position detection unit 12 stores the detection result of each select key as illustrated in FIG. 4 in the detection result DB 18.

Now, correction of the detection frequency performed by the detection frequency correcting unit 13 is described in detail. The detection frequency correcting unit 13 corrects the detection frequency based on the sequence of the detection frequency in each select key. Specifically, when three or more select keys are in positional relationship of being successively adjacent, the detection frequency correcting unit 13 corrects the detection frequency of these three or more select keys which are successively adjacent. When three or more select keys are in positional relationship of being successively adjacent, it can be said that the arrangement of the select keys is characteristic and the password concerned is highly likely to be generated by using physical key arrangement. However, among these three or more select keys successively adjacent, the select keys at the end have a smaller number of adjacent select keys, and therefore the detection frequency thereof may turn out to be "1". Accordingly, when these three or more select keys which are in positional relationship of being successively adjacent have a detection frequency of "1", the detection frequency correcting unit 13 performs correction of incrementing the detection frequency thereof.

To determine the number of the select keys in positional relationship of being successively adjacent, values of the detection frequency connected with the plus (+) symbol in detection frequency sequence are counted. For example, in the detection frequency sequence, if two plus (+) symbols continue, it can be said that three select keys are in positional relationship of being successively adjacent. More specifically, when two or more plus (+) symbols continue in the detection frequency sequence, three or more select keys are in positional relationship of being successively adjacent, so that correction of detection frequency is performed.

In the example illustrated in FIG. 4, the detection frequency sequence of the keys "d, r, c" is "2+1+1", in which two plus (+) symbols continue. This indicates that three select keys are in positional relationship of being successively adjacent. As illustrated in FIG. 3, the keys "d, r, c" are actually in positional relationship of being successively adjacent. The detection frequency correcting unit 13 performs correction of "adding 1" to the detection frequency of the select keys whose detection frequency is "1" among the keys "d, r, c." As a result of the correction, the detection frequency of the key "r" and "c" is changed from "1" to "2."

FIG. 5 illustrates one example of correction performed on the detection result illustrated in FIG. 4. Among eight select keys "w, d, r, c, 7, u, k, p" which is a sequence of select keys, only the keys "d, r, c" satisfy the condition of three or more select keys in positional relationship of being successively adjacent. Accordingly, the detection frequency of the keys "r" and "c" is corrected as described before, so that their values are changed from "1" to "2" as illustrated in FIG. 5.

Figure 6A:
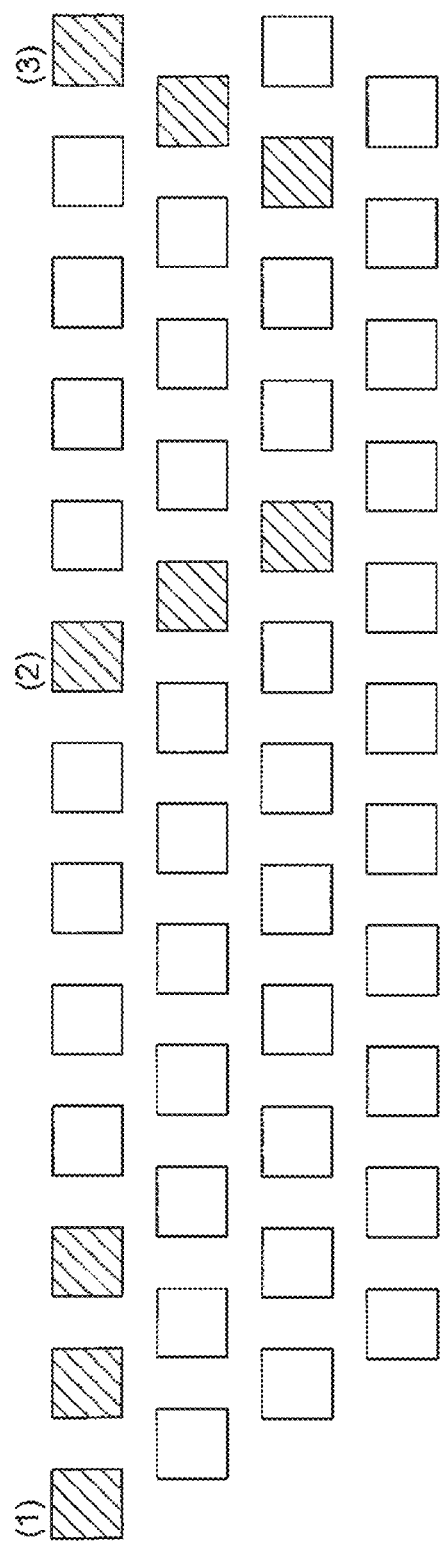
FIGS. 6(a) and 6(b) illustrate one example of arrangement patterns of three select keys to which correction of detection frequency is performed, in accordance with embodiments of the present invention.
Figure 6B:
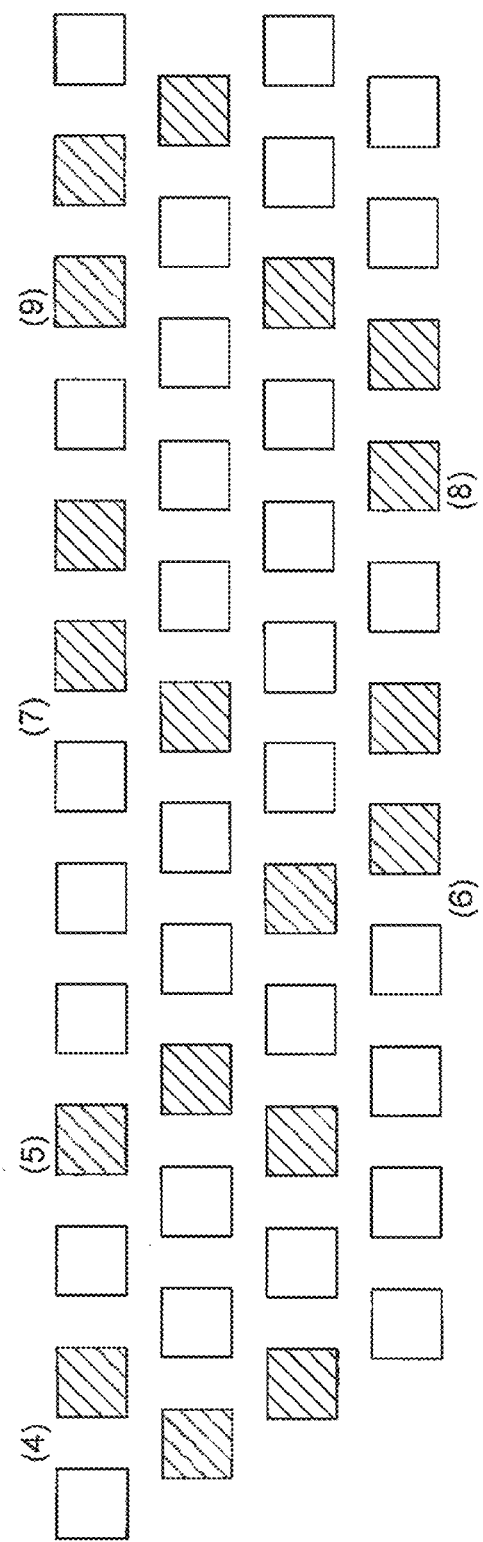

A description is now given of the specific arrangement patterns of three select keys to which correction of detection frequency is performed. FIGS. 6(*a*) and 6(*b*) illustrate one example of arrangement patterns of three select keys to which correction of detection frequency is performed. In the key arrangement patterns (1) to (9) illustrated in FIGS. 6(*a*) and 6(*b*), three shaded select keys are in a positional relationship of being successively adjacent. Accordingly, out of the preceding groups of three successively adjacent select keys, correction is performed on the keys whose detection frequency is "1".

FIG. 7 illustrates one example of the detection frequency before and after correction in each key arrangement pattern illustrated in FIGS. 6(*a*) and 6(*b*). For example, in the key arrangement pattern (1) illustrated in FIG. 6(*a*), the detection frequencies of the select keys are counted as "1", "2", and "1" in order from the select key on the left side to the select key on the right side on the keyboard. Accordingly, the initial detection frequency sequence for the select keys before correction of the detection frequency is expressed as "1+2+1." After the detection frequency is corrected, the final detection frequency after correction is expressed as "2+2+2." In the case of other key arrangement patterns (2) to (9), like the key arrangement pattern (1), correction is performed on the select keys whose detection frequencies are "1", and their detection frequencies are changed to "2".

Next, the password determination by the password determination unit 14 is described in detail. The password determination unit 14 determines whether or not the input password is, or can be, generated by using the characteristics of physical key arrangement; i.e., whether or not the password is an easily guessable password, based on the detection frequency of each select key. Here, the password determination unit 14 performs the determination based on the total number of key selecting actions performed for inputting the password and the number of select keys detected twice or more, among the select keys. Specifically, the password determination unit 14 compares a value (hereinafter referred to as password determination value), obtained by dividing "the number of select keys detected twice or more" by "the total number of key selecting actions performed for inputting the password", with a predetermined threshold value. When the password determination value is equal to or more than the threshold value, the password determination unit 14 determines that the password is, or can be, generated by using the characteristics of physical key arrangement and thus an easily guessable password.

For example, in the example illustrated in FIG. 5, the password is constituted of eight characters, and therefore "the total number of key selecting actions" is "8", and "the number of select keys detected twice or more" is "3." Accordingly, the password determination value is "0.375" which is obtained by dividing "3" by "8." When the predetermined threshold value is, for example, "1", the password determination value is smaller than the threshold value, and therefore the password determination unit 14 determines that the password to be determined cannot be generated by using the characteristics of physical key arrangement and thus not an easily guessable password. The predetermined threshold value is stored in the input password DB 16 by operation of the user and the like.

FIG. 8 illustrates one example of password determination values when the total number of key selecting actions for inputting the password is 8 to 11. For example, when the total number of key selecting actions is "8" and the number of select keys detected twice or more is "8", the password determination value is "1". For example, when the number of select keys detected twice or more is "7", the password determination value is "0.875." Similarly, for example, when the total number of key selecting actions is "9", and the number of select keys detected twice or more is "9" and "8", then the password determination values are "1" and "0.889", respectively. Furthermore, when the total number of key selecting actions is "10", and the number of select keys detected twice or more is "10" and "9", then the password determination values are "1" and "0.9", respectively.

Here, assuming that the predetermined threshold value is "1." When the number of select keys detected twice or more is, for example, "9" and the total number of key selecting actions is "9", then the password determination value and the threshold value are identical. Accordingly, the password determination unit 14 determines that the password is, or can be, generated by using the characteristics of physical key arrangement. When the number of select keys detected twice or more is "8", the password determination value is "0.889"

which is smaller than the threshold value. Accordingly, the password determination unit 14 determines that the password cannot be not generated by using the characteristics of physical key arrangement.

However, since strength required for the password varies depending on roles and/or usage of the information system used by users, the predetermined threshold value is configured to be determined in accordance with the information system to be used. For example, when the threshold value is set to "1", it is determined that the password is not generated by using the physical key arrangement and thus not an easily guessable password if there is at least one select key detected less than twice. At the same time, as a smaller threshold value is set, it is more likely that the password determination value is determined to be larger. More specifically, it is more likely that the password is, or can be, determined to be generated by using the characteristics of physical key arrangement and thus an easily guessable password. As a result, the conditions required for the passwords are strengthened.

Moreover, in the case where a large number of characters are included in a password in particular, even though some select keys detected less than twice are present, it is considered that most of the other select keys of the characters may be generated by using the characteristics of physical key arrangement. Accordingly, it is considered to strengthen the conditions required for the password by setting a smaller threshold value. For example, assuming that the total number of key selecting actions is "11", the predetermined threshold value is set to "0.8", and the number of select keys detected twice or more is "11", "10", and "9". The password determination values in all of these cases are larger than the threshold value. Accordingly, it is determined that the password is, or can be, generated by using the characteristics of physical key arrangement.

Furthermore, a plurality of predetermined threshold values may be set to classify password determination results to some ranks, and users may be notified of the ranked results. For example, assuming that the predetermined threshold value is set to "1", when the password determination value is 1, it means that the password is, or can be, generated by using the characteristics of physical key arrangement. In this case, the password is not acceptable, so that an action such as notifying the user to change the password may be taken. When the password determination value is, for example, not less than 0.9 and less than 1, the password is acceptable but there is a high possibility that the password is, or can be, generated by using the characteristics of physical key arrangement. In this case, an action such as notifying the user of the possibility and thus the risk of the password being an easily guessable password may be taken.

Figures 9A, 9B:
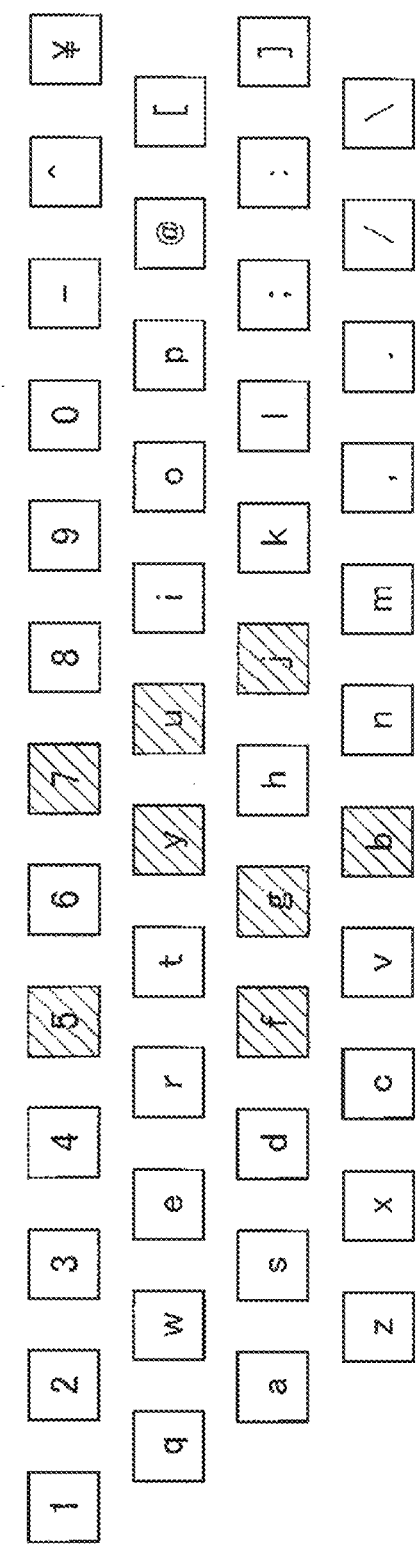
FIGS. 9(a) and 9(b) illustrate one example of password determination, in accordance with embodiments of the present invention.

Now, password determination is described with specific examples. FIGS. 9(*a*), 9(*b*), 10(*a*), 10(*b*), 11(*a*), 11(*b*), 12(*a*), 12(*b*), 13(*a*), and 13(*b*) each describe one example of password determination.

First, in the example illustrated in FIGS. 9(*a*) and 9(*b*), shaded eight keys "5, f, g, y, b, 7, u, j", which is a sequence of select keys, are used to input an eight-character password. First, the key "5", whose detection frequency is counted first, does not have other select keys that are adjacent thereto. There is also no select key between the key "5" and the key "f" whose detection frequency is counted next, and therefore it can be said that these keys "5" and "f" are not in positional relationship of being successively adjacent. Accordingly, the detection frequency of the key "5" is counted as "0" and a minus (−) symbol is attached to between the detection frequency (that is, "0") of the key "5" and the detection frequency of the key "f."

The subsequent keys "f", "g", "y", "b", "7", "u", and "j" each have other select keys which are in positional relationship of being adjacent, and therefore it can be said that these seven select keys are in positional relationship of being successively adjacent. Accordingly, an initial detection frequency sequence of the keys "f, g, y, b, 7, u, j" is "1+3+3+1+2+3+1." Furthermore, the detection frequency of the select keys whose detection frequency is "1" is corrected, so that correction of "adding 1" to the detection frequency of the keys "f", "b", and "j" is performed. In the end, the final detection frequency of the select keys "5, f, g, y, b, 7, u, j" after correction is expressed as "0−2+3+3+2+2+3+2."

Here, since the password is constituted of eight characters, "the total number of key selecting actions" is "8", and "the number of select keys detected twice or more" is "7" as the select keys detected twice or more are "f", "g", "y", "b", "7", "u", and "j." Accordingly, the password determination value is "0.875" which is obtained by dividing "7" by "8." When the predetermined threshold value is, for example, "1", the password determination value is smaller than the threshold value, and therefore the password determination unit 14 determines that the eight-character password to be determined cannot not be generated by using the characteristics of physical key arrangement.

Next, in the example illustrated in FIGS. 10(*a*) and 10(*b*), an eight-character password is input by using shaded eight keys "1, q, a, z, x, d, r, 5, which is a sequence of select keys." First, the key "1" whose detection frequency is counted first is adjacent to the key "q." Accordingly, the detection frequency of the key "1" is counted as "1" and a plus (+) symbol is attached to between the detection frequency (that is, "1") of the key "1" and the detection frequency of the key "q." Similarly, the subsequent keys "q", "a", "z", "x", "d", and "r" each have two other select keys in positional relationship of being adjacent. The key "5" is adjacent to the key "r." Accordingly, an initial detection frequency sequence of the keys "1, q, a, z, x, d, r, 5" is "1+2+2+2+2+2+2+1." Furthermore, the detection frequency of the select keys whose detection frequency is "1" is corrected, so that correction of "adding 1" to the detection frequencies of the keys "1" and "5" is performed. In the end, the final detection frequency of the select keys "1, q, a, z, x, d, r, 5" after correction is expressed as "2+2+2+2+2+2+2+2."

Here, since the password is constituted of eight characters, "the total number of key selecting actions" is "8", and "the number of select keys detected twice or more" is also "8." Accordingly, the password determination value is "1" which is obtained by dividing "8" by "8." When the predetermined threshold value is, for example, "1", the password determination value is equal to the threshold value, and therefore the password determination unit 14 determines that the eight-character password to be determined is, or can be, generated by using the characteristics of physical key arrangement and thus an easily guessable password.

Next, in the example illustrated in FIGS. 11(*a*) and 11(*b*), an eight-character password is input by using shaded eight keys "1, q, a, z, m, k, o, 0, which is a sequence of select keys." First, the key "1" whose detection frequency is counted first is adjacent to the key "q." Accordingly, the detection frequency of the key "1" is counted as "1" and a plus (+) symbol is attached to between the detection frequency (that is, "1") of the key "1" and the detection frequency of the key "q." Similarly, the subsequent keys "q", "a", "k", and "o" each have two other select keys in positional relationship of being adjacent. The keys "z", "m", and "0" each have another select key in positional relationship of being adjacent thereto. Furthermore, the keys "1, q, a, z", and the keys "m, k, o, 0" are each four select keys which are successively adjacent. However, no select key is present between the keys "z" and "m."

Accordingly, an initial detection frequency sequence of the keys "1, q, a, z, m, k, o, 0" is "1+2+2+1−1+2+2+1." Furthermore, the detection frequency of the select keys whose detection frequency is "1" is corrected, so that correction of "adding 1" to the detection frequency of the keys "1", "z", "m", and "0" is performed. In the end, the final detection frequency of the select keys "1, q, a, z, m, k, o, 0" after correction is expressed as "2+2+2+2−2+2+2+2."

Here, since the password is constituted of eight characters, "the total number of key selecting actions" is "8", and "the number of select keys detected twice or more" is also "8." Accordingly, the password determination value is "1" which is obtained by dividing "8" by "8." When the predetermined threshold value is, for example, "1", the password determination value is equal to the threshold value, and therefore the password determination unit 14 determines that the eight-character password to be determined is, or can be, generated by using the characteristics of physical key arrangement and thus an easily guessable password.

Figures 10A, 10B:
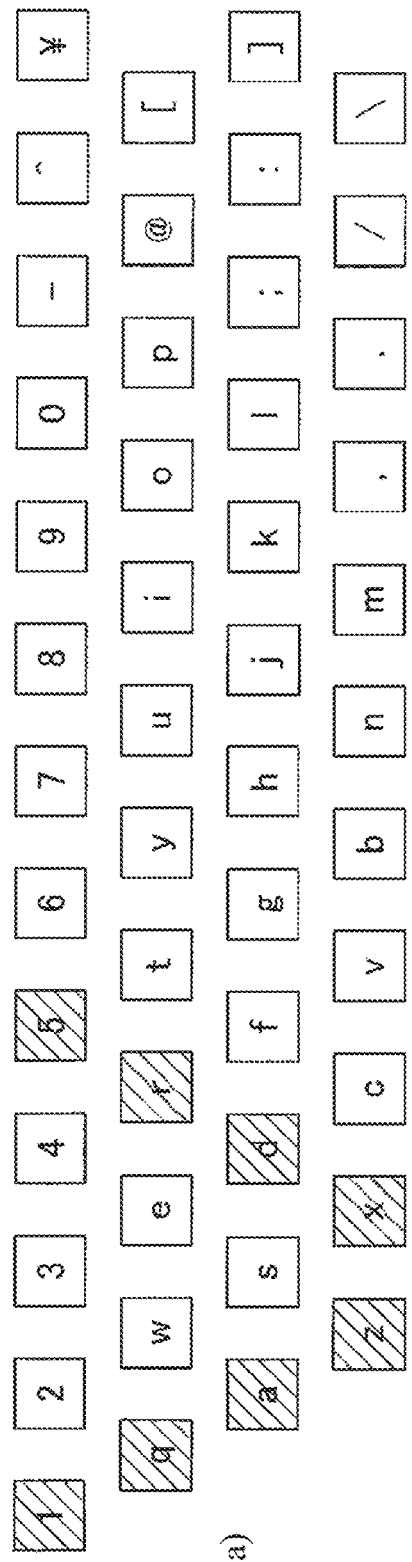
FIGS. 10(a) and 10(b) illustrate one example of password determination, in accordance with embodiments of the present invention.
Figures 11A, 11B:
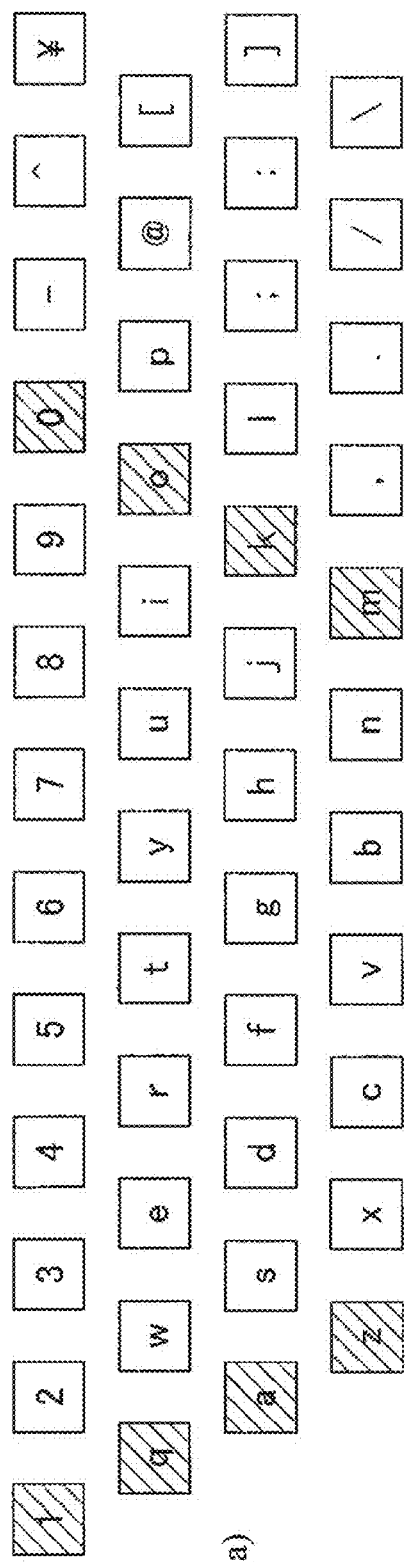
FIGS. 11(a) and 11(b) illustrate one example of password determination, in accordance with embodiments of the present invention.

The key arrangement of the select keys illustrated in FIG. 11(a) includes the key arrangement "m, k, o, 0" instead of the key arrangement "x, d, r, 5" illustrated in FIG. 10(a), the keys "m, k, o, 0" being at positions parallelly shifted right from the positions of the keys "x, d, r, 5". In the example illustrated in FIG. 10(a), eight select keys are configured to be successively adjacent, whereas in the example illustrated in FIG. 11(a), two pairs of four continuous select keys are present. In the present embodiment, the password determination values of both examples are identical, and the password determination results thereof are also identical.

Figures 12A, 12B:
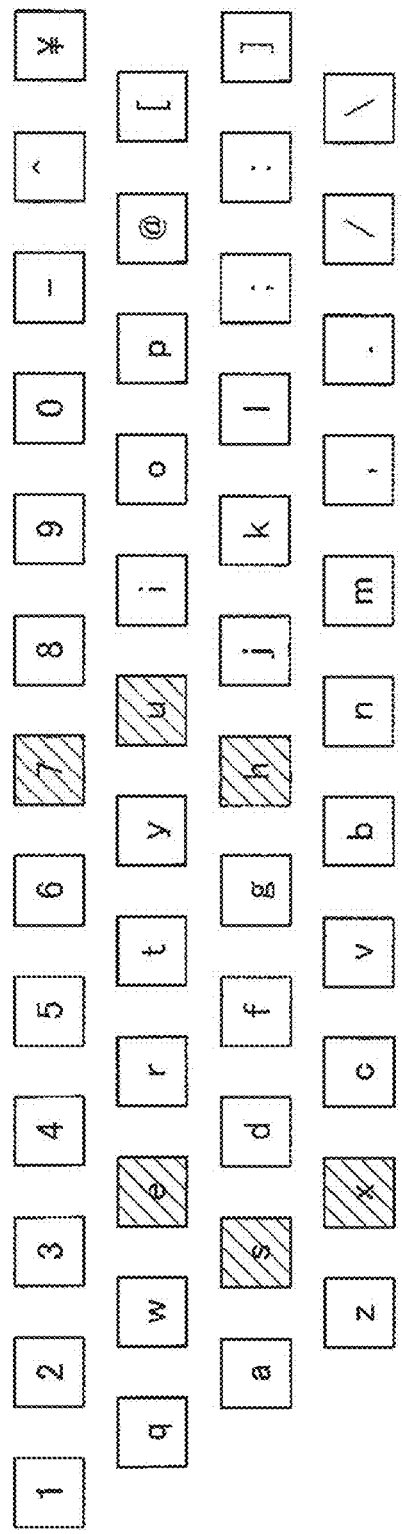
FIGS. 12(a) and 12(b) illustrate one example of password determination, in accordance with embodiments of the present invention.

Next, in the example illustrated in FIGS. 12(a) and 12(b), an eight-character password is input by using shaded six keys "e, s, x, 7, h, u." That is, the password is input by using the same key a plurality of times. In the illustrated example, the keys "e" and "7" are used twice to input a password such as "eesx77uh" or "7esx7ehu." The detection frequency of the select keys is counted in order of "s, e, e, x, 7, 7, h, u, which is a sequence of select keys."

First, the key "s" whose detection frequency is counted first is adjacent to the keys "x" and "e." Accordingly, the detection frequency of the key "s" is counted as "2" and a plus (+) symbol is attached to between the detection frequency (that is, "2") of the key "s" and the detection frequency of the next key "e." Next, since the key "e" is adjacent to the key "s", the detection frequency of the key "e" is counted as "1". After the key "e", the detection frequency of the same key "e" is counted again.

Here, although it is unthinkable that the same keys are physically adjacent, same characters/symbols are input if the same keys are selected, which results in generation of a password with a simpler configuration. In other words, it can be said that there is an increased possibility that the password is generated by using the physical key arrangement. It can be said that passwords such as those configured by successively using only one character and those configured by alternately using two characters are passwords generated by using the physical key arrangement.

Accordingly, in this embodiment, when the same key is selected a plurality of times, there is a high possibility that password is generated by using physical key arrangement, and correction of "adding 2" to the detection frequency of the keys selected a plurality of times is performed to increment the detection frequency. In the case of the same keys, they are regarded as the keys in positional relationship of being successively adjacent, and a plus (+) symbol is attached to between the detection frequencies of both the keys.

Next, since the key "x" is adjacent to the key "s", the detection frequency is "1." Since there is no select key between the key "x" and the key "7" whose detection frequency is counted next, a minus (−) symbol is attached to between the detection frequency (that is, "1") of the key "x", and the detection frequency of the key "7." Next, since the key "7" is adjacent to the key "u", the detection frequency is "1", and the detection frequency of the key "7" is successively counted. Accordingly, a plus (+) symbol is attached to between the detection frequency of the key "7" and the detection frequency of the next key "7." The detection frequency of the subsequent keys "h" and "u" is also counted similarly.

An initial detection frequency sequence of the keys "s, e, e, x, 7, 7, h, u" is "2+1+1+1−1+1+1+2." Here, the detection frequency of the select keys selected a plurality of times is corrected, so that correction of "adding 2" to the detection frequency of the keys "e" and "7" is performed. Accordingly, the detection frequency sequence of the keys "s, e, e, x, 7, 7, h, u" is expressed as "2+3+3+1−3+3+1+2." Moreover, the detection frequency of the select keys whose detection frequency is "1" is corrected, so that correction of "adding 1" to the detection frequency of the keys "x" and "h" is performed. In the end, the final detection frequency of the select keys "s, e, e, x, 7, 7, h, u" after correction is expressed as "2+3+3+2−3+3+2+2."

Here, since the password is constituted of eight characters, "the total number of key selecting actions" is "8", and "the number of select keys detected twice or more" is also "8." Accordingly, the password determination value is "1" which is obtained by dividing "8" by "8." When the predetermined threshold value is, for example, "1", the password determination value is equal to the threshold value, and therefore the password determination unit 14 determines that the eight-character password to be determined is, or can be, generated by using the characteristics of physical key arrangement.

In the example illustrated in FIGS. 12(a) and 12(b), correction of "adding 2" to the detection frequency of the select keys selected a plurality of times is performed, and then correction of "adding 1" to the detection frequency of the select keys whose detection frequency is "1" is performed. However, the present invention is not limited to the configuration of this example. For example, correction of "adding 1" to the detection frequency of the select keys whose detection frequency is "1" may be performed first. In this case, correction of "adding 1" to the detection frequency of the select keys "e", "7", "x", and "h" whose detection frequency is "1" is performed first for example, so that a detection frequency sequence of the keys "s, e, e, x, 7, 7, h, u" is expressed as "2+2+2+2−2+2+2+2." Then, correction of "adding 2" to the detection frequency of the select keys "e" and "7" selected a plurality of times is performed.

Figures 13A, 13B:
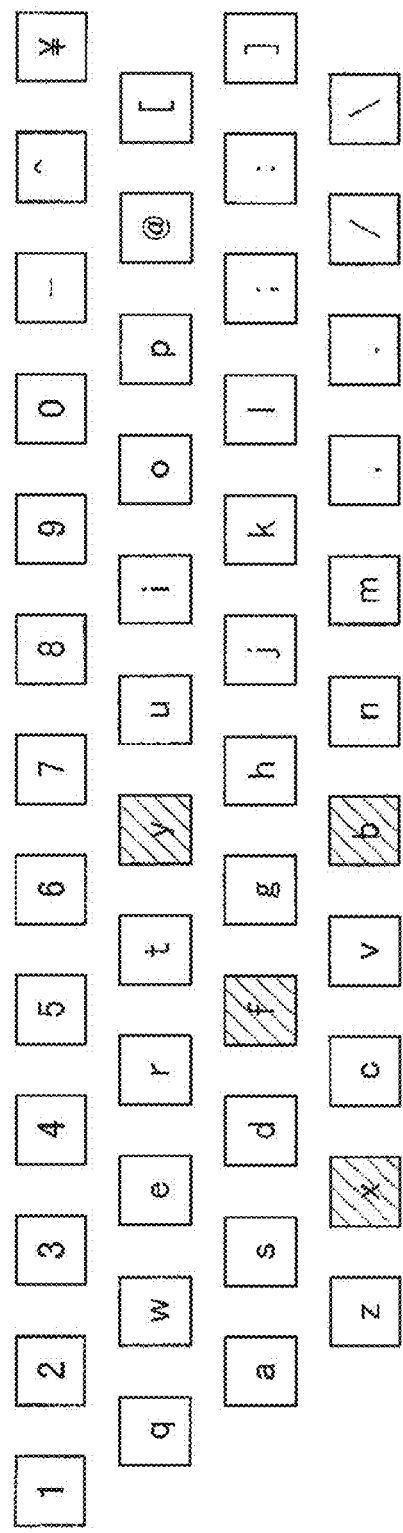
FIGS. 13(a) and 13(b) illustrate one example of password determination, in accordance with embodiments of the present invention.

In the example illustrated in FIGS. 13(a) and 13(b), an eight-character password is input by using shaded four keys "x, f, y, b". That is, the password is input by using the same key a plurality of times. In the illustrated example, the key "x" is used three times, and the keys "f" and "y" are used twice to input a password such as "xxxffyyb" and "fyfxbxyx." Here, since four keys "x", "f", "y", and "b" are not adjacent to each other, the detection frequency of each key is counted as "0." However, the keys "x", "f", and "y" are selected a plurality of times. Therefore, if there is any select key selected a plurality of times even though there are no select keys in positional relationship of being adjacent to each other, the password determination unit 14 still executes processing of the input password as a determination target.

In the illustrated example, the detection frequency of the select keys is counted in order of "x, x, x, f, f, y, y, b," which is a sequence of select keys." Since each select key is not adjacent to each other, an initial detection frequency sequence of the keys "x, x, x, f, f, y, y, b" is "0+0+0−0+0−0+0−0." However, since the keys "x", "f", and "y" are selected a plurality of times, correction of "adding 2" to the detection frequency thereof is performed. In the end, the final detection frequency of the select keys "x, x, x, f, f, y, y, b" after correction is expressed as "2+2+2−2+2−2+2−0."

Here, since the password is constituted of eight characters, "the total number of key selecting actions" is "8", and "the number of select keys detected twice or more" is "7." Accordingly, the password determination value is "0.875" which is obtained by dividing "7" by "8." When the predetermined threshold value is, for example, "1", the password determination value is smaller than the threshold value, and therefore the password determination unit 14 determines that the eight-character password to be determined is not generated by using the characteristics of physical key arrangement. When the predetermined threshold value is, for example, "0.8", the password determination value is larger than the threshold value, and therefore the password determination unit 14 determines that the eight-character password to be determined is generated by using the characteristics of physical key arrangement.

In the preceding examples illustrated in FIGS. 4-13(*b*), the following rules are used for correcting the initial detection frequency of select keys on a keyboard.

A first rule for correcting the initial detection frequency is: if three or more select keys are successively adjacent, then the final detection frequency is calculated by incrementing the initial detection frequency by 1 for each select key, of the three or more successively adjacent select keys, whose initial detection frequency is 1, and not changing the initial detection frequency of the other select keys (i.e., incrementing the other select keys by zero).

A second rule for correcting the initial detection frequency is: the final detection frequency is calculated by incrementing the initial detection frequency by 2 for each select key whose corresponding character in the password appears a plurality of times in the password.

A third rule for correcting the initial detection frequency is: for each select key satisfying both the first rule and the second rule, only the second rule is used, and not changing the initial detection frequency of the other select keys (i.e., incrementing the other select keys by zero).

Thus correcting the initial detection frequency of each select key comprises calculating an additive correction to the initial detection frequency of each select key, wherein the additive correction is specific to each select key. An additive correction of zero to the initial detection frequency of a given select key results in the initial detection frequency of the given select key not being changed.

Figure 14:
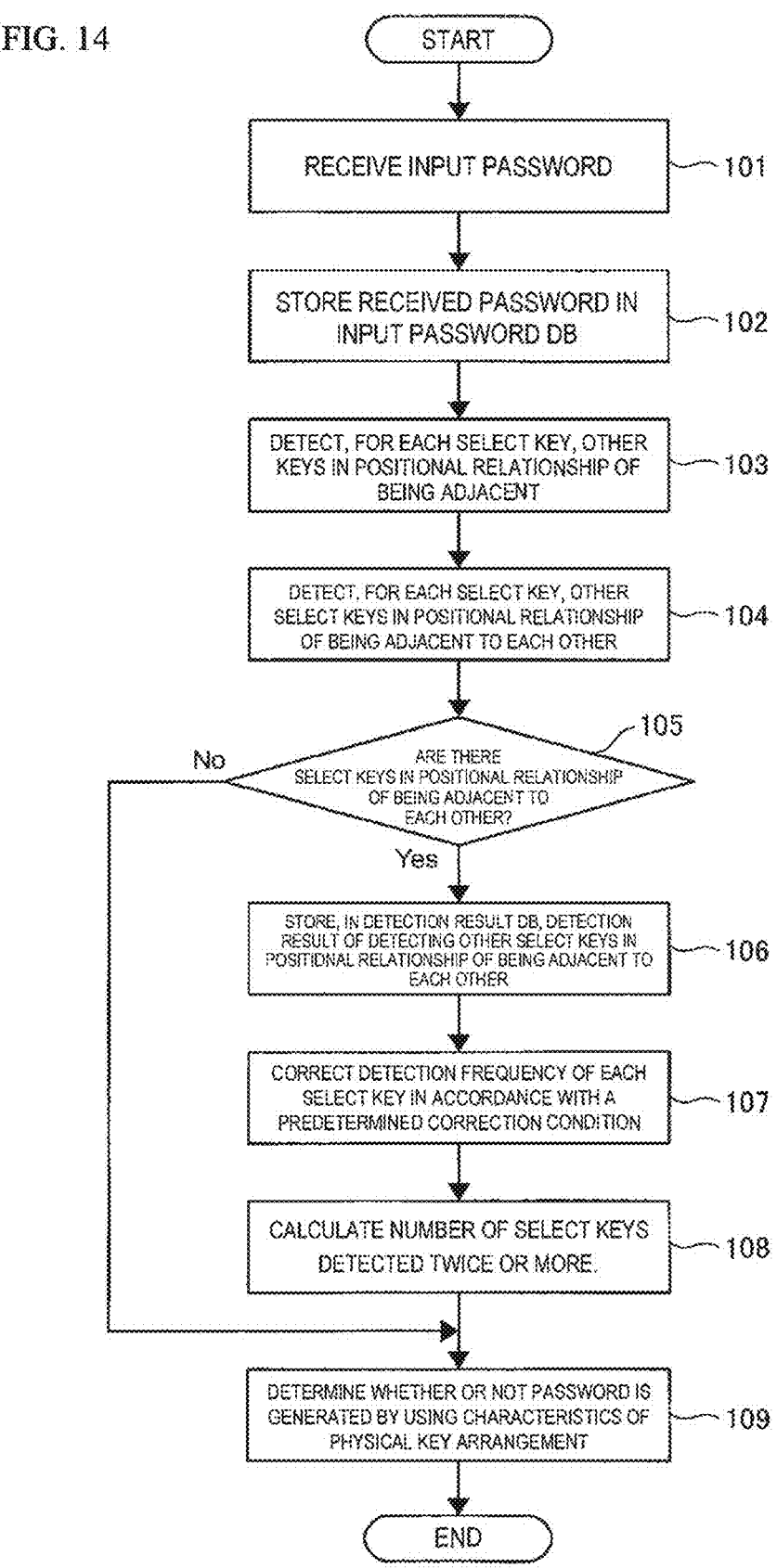
FIG. 14 is a flow chart illustrating one example of processing procedures of the password verification system, in accordance with embodiments of the present invention.

A description is now given of the processing procedures of the password verification system 10. FIG. 14 is a flow chart illustrating one example of processing procedures of the password verification system 10. The flow chart of FIG. 14 assesses whether a password can be generated by using characteristics of a physical key arrangement of keys of an input device.

In an initial state, the information on the key arrangement of various kinds of keyboards is stored in the keyboard DB 17. In accordance with each information system, the threshold values used for password determination are set in advance, and are stored in the input password DB 16.

First, when a user inputs a password to be registered for authentication at the time of using an information system for the first time and the like, the password reception unit 11 receives the input password (Step 101). Here, the password reception unit 11 refers to the password rule stored in the input password DB 16, and when the input password is in conformity to the password rule, the password reception unit 11 receives the password. If the input password does not conform to the password rule, the display unit 15 displays, for example, a message informing that the password rule is not conformed and prompts the user to input a different password. The password reception unit 11 then stores the received password in the input password DB 16 (Step 102).

The password comprises a plurality of characters. Each character in each position in the password corresponds to a respective select key in a sequence of select keys of the input device. Thus, there is a one-to-one correspondence between each character in each position in the password and each select key in the sequence of select keys. The ordering of select keys in the sequence of select keys depends on the physical key arrangement of the select keys in the input device. The ordering of characters in the password does not necessarily correspond to the ordering of select keys in the sequence of select keys.

Next, the adjacent position detection unit 12 acquires information indicative of key arrangement of a keyboard used by the user for inputting the password, from the keyboard DB 17 and the adjacent position detection unit 12 uses the password stored in the input password DB 16 as a password to be determined, and detects, for each select key selected for inputting the password, other keys in positional relationship of being adjacent in accordance with the key arrangement of the keyboard used by the user (Step 103). Next, the adjacent position detection unit 12 detects other select keys in positional relationship of being adjacent to each other, based on the information on the other adjacent keys detected for each select key (step 104). The adjacent position detection unit 12 then determines whether or not the select keys in positional relationship of being adjacent to each other are present in the password to be determined (Step 105).

When the select keys in positional relationship of being adjacent to each other are present (Yes in Step 105), the adjacent position detection unit 12 stores in the detection result DB 18 the detection result of detecting other select keys in positional relationship of being adjacent to each other, for each of the select keys (Step 106). For each select key in the sequence of select keys, an initial detection frequency is calculated as equal to a total number of other select keys, in the sequence of select keys, adjacent to each select key. The adjacent position detection unit 12 stores the detection frequency of each select key in the detection result DB 18 as the detection result. In Step 105, when there is any select key selected a plurality of times, the adjacent position detection unit 12 determines that the select keys in positional relationship of being adjacent to each other are present (Yes in Step 105), and stores in the detection result DB 18 the information on the select key selected a plurality of times. When the select keys in positional relationship of being adjacent to each other are not present (No in Step 105), the procedures proceed to Step 109 described later.

After Step 106, the detection frequency correcting unit 13 corrects the detection frequency of each select key detected by the adjacent position detection unit 12 in accordance with a predetermined correction condition (Step 107). Here, the detection frequency correcting unit 13 executes correction when three or more select keys are in positional relationship of being successively adjacent or when a select key selected a plurality of times is present. Based on the result of correction, the detection frequency correcting unit 13 updates the detection frequency of each select key stored in the detection result DB 18. Next, the password determination unit 14 calculates the number of select keys detected twice or more, based on the detection frequency of each select key stored in the detection result DB 18 (Step 108).

Steps 107 and 108 generate, for each select key in the sequence of select keys, a final detection frequency as equal to a sum of the initial detection frequency of each select key and an additive correction specific to each select key.

Next in Step 109, the password determination unit 14 calculates a password determination value based on the total number of key selecting actions for inputting the password and the number of select keys detected twice or more calculated in Step 107. The password determination value is calculated as a ratio of (i) a total number of select keys, in the sequence of select keys, having a final detection frequency of a specified minimum detection frequency and (ii) a total number of select keys in the sequence of select keys. The minimum detection frequency is 2 in one embodiment; more generally, the minimum detection frequency may be 2 or 3. The password determination unit 14 then compares the calculated password determination value and a predetermined threshold value to determine whether or not the password to be determined is an easy-to-guess password generated by using the characteristics of physical key arrangement (Step 109).

More specifically, the password determination unit 14 determines, from the preceding comparison, whether the calculated password determination value is less than the predetermined threshold value. If so, an indication that the password cannot be generated by using the characteristics of the physical key arrangement of keys of the input device is stored in a database. If not, an indication that the password can be generated by using the characteristics of the physical key arrangement of keys of the input device is stored in the database.

In this case, when negative determination (No) is made in Step 105, there are no select keys in positional relationship of being adjacent to each other. Accordingly, the password determination unit 14 determines that the password to be determined is not a password generated by using the characteristics of physical key arrangement. After the password determination is made, the password determination unit 14 outputs the determination result to the display unit 15 and also stores the result in the key determination result DB 19. The display unit 15 displays the determination result to notify the user of the determination result, by which the processing flow ends.

As described in the foregoing, the password verification system 10 according to this embodiment determines whether or not a password is generated by using the characteristics of key arrangement and is an easily guessable password, based on arrangement of each key selected for inputting the password. Since the password verification system 10 makes determination by detecting adjacency of each selected key, users do not need to register in advance passwords generated by using the characteristics of key arrangement as detection target passwords.

Moreover, there are passwords formed by, for example, unicursal clockwise selected keys. By switching the order of selecting the keys in these passwords, passwords are generated which are determined to be complex by the third parties at a first glance. Even such passwords can be detected as a password generated by using the characteristics of key arrangement if the password verification system 10 is used. The password verification system 10 is configured to cope with actions of malicious third parties, who extract character strings formed by using characteristic key arrangement and attempt to find out the passwords by switching the characters therein. The password verification system 10 suppress use of the passwords which are generated by using physical key arrangement and are easily guessable passwords.

Figure 15:
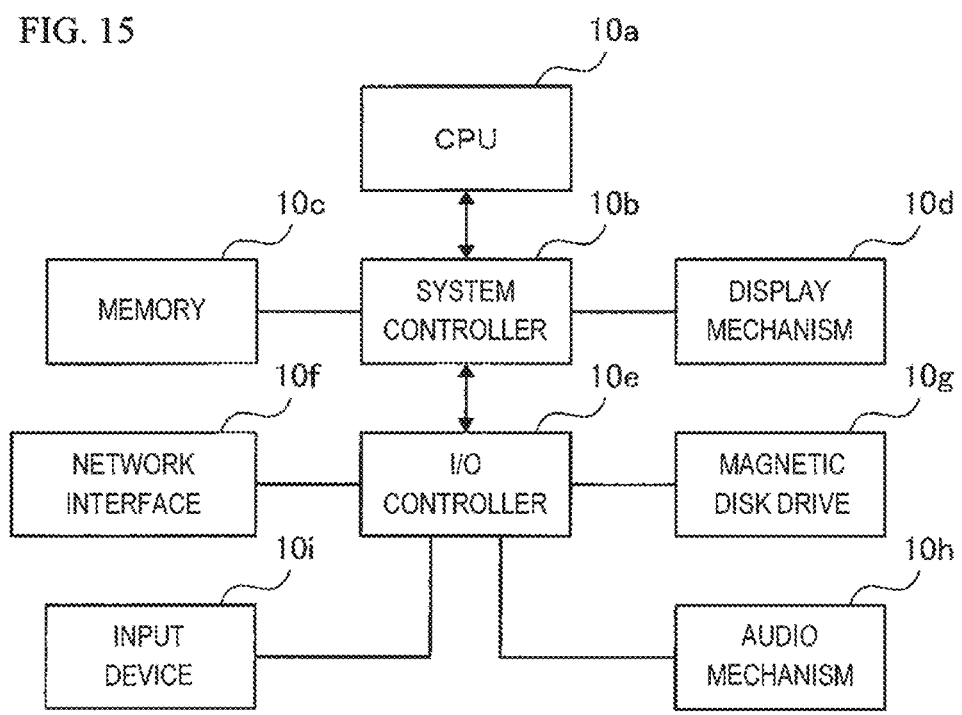
FIG. 15 illustrates a hardware configuration example suitable for constituting the password verification system, in accordance with embodiments of the present invention.
Figure 16A:
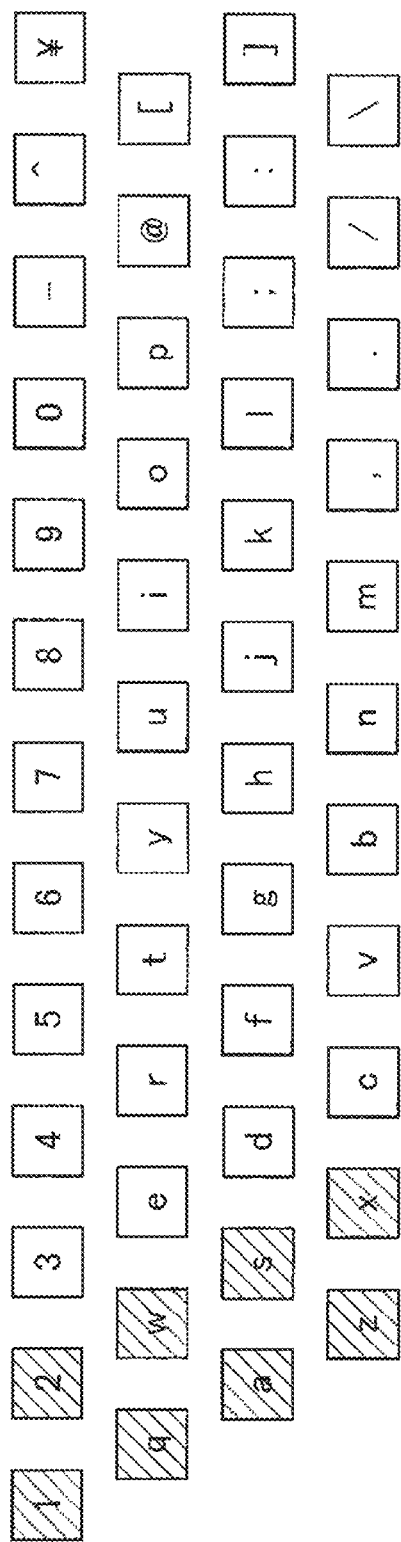
FIGS. 16(a) and 16(b) describe one example of passwords generated by using the characteristics of physical key arrangement, in accordance with embodiments of the present invention.
Figure 16B:
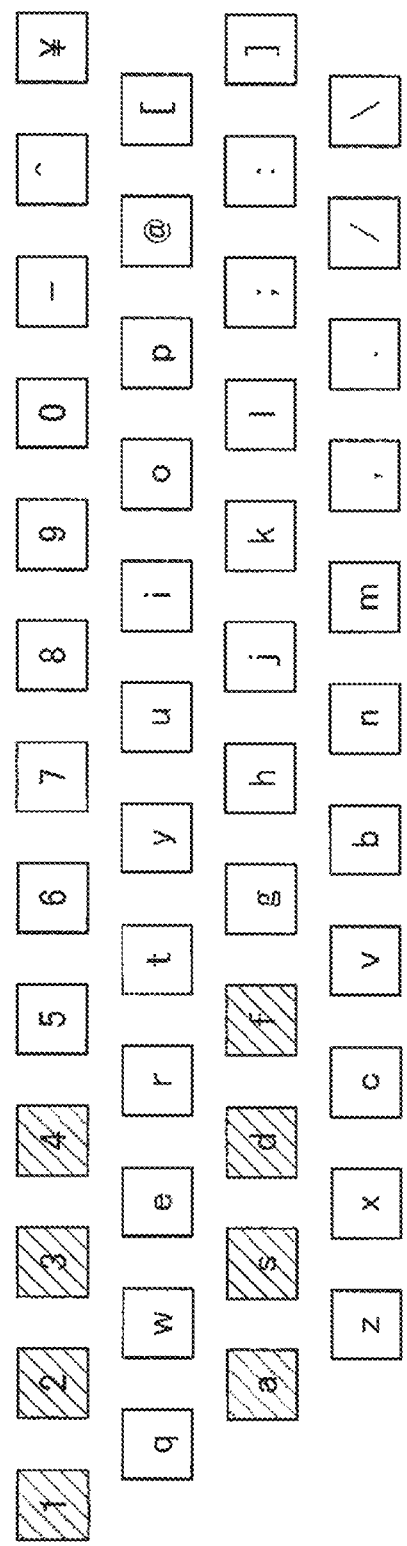

Finally, the hardware configuration of the password verification system 10 is described. FIG. 15 illustrates a hardware configuration example suitable for constituting the password verification system 10 according to the present embodiment. In this description, the system may be applied to a computer. The computer illustrated in FIG. 15 is within a computer system and includes a central processing unit (CPU) 10a as an operation means, and a memory 10c as a main memory means. The computer also includes external devices such as a magnetic disk device (hard disk drive (HDD)) 10g, a network interface 10f, a display mechanism 10d including a display device, an audio mechanism 10h, and an input device 10i such as a keyboard, a mouse, and the like.

In the configuration example illustrated in FIG. 15, the memory 10c and the display mechanism 10d are connected to the CPU 10a via a system controller 10b. The network interface 10f, the magnetic disk device 10g, the audio mechanism 10h, and the input device 10i are connected with the system controller 10b via an I/O controller 10e. Each component member is connected by various kinds of buses, such as a system bus and an input/output bus.

In FIG. 15, the magnetic disk device 10g stores an OS program and application programs. When these programs are loaded into the memory 10c and executed by the CPU 10a, functions of the password reception unit 11, the adjacent position detection unit 12, the detection frequency correcting unit 13, and the password determination unit 14 in the password verification system 10 according to this embodiment are implemented. A memory means such as the memory 10c and the magnetic disk device 10g implements the input password DB 16, the keyboard DB 17, the detection result DB 18, and the key determination result DB 19. Furthermore, the display mechanism 10d implements the display unit 15.

FIG. 15 merely illustrates a computer hardware configuration to which this embodiment is adequately applied. The present embodiment can widely be applied to the apparatuses having a function of executing determination of passwords, and the present embodiment can be implemented not only in the illustrated configuration but also in other configurations.

In the description of this embodiment, the detection frequency is corrected when three or more select keys are in positional relationship of being successively adjacent, or when a select key is selected a plurality of times. However, the correction condition is not limited to such conditions. Any correction conditions may be used as long as they are adequately adopted for determining the passwords generated by using the characteristics of physical key arrangement.

Furthermore, in the present embodiment, the password determination unit 14 calculates the password determination value based on the number of select keys detected twice or more. However, the present invention is not limited to such configuration. The password determination unit 14 may, for example, calculate the password determination value by summing up the number of select keys detected three times or more. As a lower limit of the detection frequency for use in calculation of the password determination value is set higher, the number of select keys used for calculation of the password determination value decreases, and therefore the password determination value becomes smaller. This hinders determination of the passwords generated by using the characteristics of physical key arrangement, as a result of which the conditions required for the passwords are to be loosened.

In the present embodiment, the password verification system 10 calculates the password determination value by dividing the number of select keys detected twice or more by the total number of key selecting actions for inputting the password, and makes password determination based on the calculated password determination value. However, determination processing is not limited to such configuration. For example, the password verification system 10 may determine that the password is generated by using the characteristics of physical key arrangement, if the number of select keys detected twice or more exceeds a predetermined threshold value. Any determination processing may be used as long as determination is made based on adjacency of the select keys.

Furthermore, in the description of the present embodiment, users input passwords with a keyboard. However, the present invention is not limited to such configuration. For example, password determination may be made for passwords which are input by such input devices as numeric keypads and liquid crystal touch panels which display alphabets and numeric characters, as used in automatic teller machines (so-called ATMs) installed in banking facilities and the like.

In the present embodiment, password determination is made in such occasions as when users use an information system for the first time and when users change passwords. However, the present invention is not limited to such configuration. For example, the password verification system 10 may make password determination, when users who have registered passwords input their passwords for user authentication. In this case, when a password identical to the registered password is input and the password is determined to be generated by using physical key arrangement, a message is displayed for example, for prompting the user concerned to change the password since the password is an easily guessable password though it is registered before.

Furthermore, in the present embodiment, the determination result by the password determination unit 14 is stored in the key determination result DB 19. Accordingly, if the determination result of the password received in the password reception unit 11 is already stored in the key determination result DB 19, the display unit 15 may display the result based on the stored determination result.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present invention has been described with the embodiment, the technical scope of the present invention is not limited to the embodiment disclosed. It is apparent to those skilled in the art that various arrangements and modifications shall be adopted without departing from the spirit and scope of the present invention.

What is claimed is:

1. A system, comprising:
a memory; and
a processor, wherein the processor is configured to:
receive a password input when keys are selected from a key arrangement unit including a plurality of keys arranged thereon;
detect, for each of the selected keys included in the password, presence of adjacent keys, wherein adjacent keys are selected keys adjacent thereto, and to determine the password to be an easily guessable trivial password when a predetermined condition concerning the adjacent keys is satisfied,
wherein the processor determines the password to be the easily guessable trivial password when the number of selected keys having a plurality of adjacent keys satisfies the predetermined condition,
wherein the easily guessable trivial password is a password generated using a cross direction of a physical key arrangement of a keyboard; and
perform correction when the predetermined condition is satisfied,
wherein the predetermined condition is that the selected keys include three or more selected keys in positional relationship of being successively adjacent, and
wherein when the predetermined condition is satisfied, the processor performs correction by incrementing the number of the adjacent keys for the three or more selected keys in positional relationship of being successively adjacent.

2. The system according to claim 1, wherein:
the processor determines the password to be an easily guessable trivial password when a condition that a value, obtained by dividing the number of the selected keys having the plurality of adjacent keys by the total number of key selecting actions performed for inputting the password, is equal to or more than a predetermined threshold value is satisfied as the predetermined condition.

3. The system of claim 1, wherein:
the processor determines the password to be an easily guessable trivial password when the selected keys include a particular key selected a plurality of times and the particular key selected a plurality of times satisfies the predetermined condition.

4. The system of claim 1, wherein:
when a condition that the selected keys include a selected key selected a plurality of times is satisfied as the predetermined correction condition, the processor performs correction by incrementing the number of the adjacent keys for the selected key selected a plurality of times.

5. The system of claim 1, wherein the three or more selected keys in positional relationship of being successively adjacent are selected unicursally clockwise starting from a first selected key of the three or more selected keys.

6. A system, comprising:
a memory; and
a processor, wherein the processor is configured to:
receive a password input when keys arranged on a keyboard are selected;
store key arrangement information indicative of key arrangement of the keyboard used for inputting the password;
detect, for each of the selected keys received in the reception unit, adjacent keys, wherein adjacent keys are keys adjacent thereto, with reference to the key arrangement information stored in the storage unit;

calculate a specified value based on the number of the selected keys having two or more adjacent keys detected in the key detection unit;

perform correction when the predetermined condition is satisfied, wherein the predetermined condition is that the selected keys include three or more selected keys in positional relationship of being successively adjacent, and wherein when the predetermined condition is satisfied, the processor performs correction by incrementing the number of the adjacent keys for the three or more selected keys in positional relationship of being successively adjacent;

compare the value calculated by the calculation unit and a predetermined threshold value, and to determine the password to be an easily guessable trivial password when the calculated value is equal to or more than the predetermined threshold value, wherein the easily guessable trivial password is a password generated using a cross direction of a physical key arrangement of a keyboard; and display a result of determination.

7. A computer program product comprising a non-transitory computer readable storage medium having program code embodied therewith, the program code executable by a processor to cause the processor to perform a method, the method comprising:

a function of receiving a password input when keys are selected from a key arrangement unit including a plurality of keys arranged thereon; and a function of detecting, for each of the selected keys included in the password, presence of adjacent keys, wherein adjacent keys are other selected keys adjacent thereto, and determining the password to be an easily guessable trivial password when a predetermined condition concerning the adjacent keys is satisfied, wherein the password is determined to be an easily guessable trivial password when the number of selected keys having a plurality of adjacent keys satisfies the predetermined condition, and wherein the easily guessable trivial password is a password generated using a cross direction of a physical key arrangement of a keyboard; and a function of correcting when the predetermined condition is satisfied, wherein the predetermined condition is that the selected keys include three or more selected keys in positional relationship of being successively adjacent, and wherein when the predetermined condition is satisfied, the correcting includes incrementing the number of the adjacent keys for the three or more selected keys in positional relationship of being successively adjacent.

* * * * *